United States Patent [19]

Furukawa et al.

[11] Patent Number: 5,505,674

[45] Date of Patent: Apr. 9, 1996

[54] CONTROL SYSTEM WITH FAILSAFE RANGE PASSAGES IN A CHANGEOVER VALVE FOR SHIFT-BY-WIRE AUTOMATIC TRANSMISSION

[75] Inventors: Toshiharu Furukawa; Yoshio Shindo, both of Susono, Japan

[73] Assignee: Toyoda Jidosha Kabushiki Kaisha, Toyota, Japan

[21] Appl. No.: 380,407

[22] Filed: Jan. 30, 1995

Related U.S. Application Data

[62] Division of Ser. No. 11,496, Jan. 29, 1993, Pat. No. 5,409,434.

[30] Foreign Application Priority Data

| Jan. 30, 1992 | [JP] | Japan | 4-40297 |
| Feb. 5, 1992 | [JP] | Japan | 4-54310 |
| Feb. 12, 1992 | [JP] | Japan | 4-59026 |

[51] Int. Cl.$^6$ ............................. F16H 61/12; F16H 61/16
[52] U.S. Cl. ..................... 477/130; 477/906; 475/128
[58] Field of Search ............................. 477/130, 131, 477/138, 155, 906; 475/128

[56] References Cited

U.S. PATENT DOCUMENTS

| 5,014,577 | 5/1991 | Takada et al. | 477/130 |
| 5,052,247 | 10/1991 | Kato et al. | 477/906 X |
| 5,409,434 | 4/1995 | Furukawa et al. | 477/130 |

FOREIGN PATENT DOCUMENTS

| 354006 | 4/1990 | European Pat. Off. | 477/906 |
| 422844 | 4/1991 | European Pat. Off. | 477/130 |
| 52-10178 | 3/1977 | Japan . | |
| 52-25505 | 7/1977 | Japan . | |
| 53-8028 | 3/1978 | Japan . | |
| 57-57948 | 4/1982 | Japan . | |
| 57-29290 | 6/1982 | Japan . | |
| 58-211060 | 12/1983 | Japan . | |
| 62-184249 | 11/1987 | Japan . | |
| 285564 | 3/1990 | Japan . | |
| 220869 | 5/1990 | Japan . | |

*Primary Examiner*—Khoi Q. Ta
*Attorney, Agent, or Firm*—Oblon, Spivak, McClelland, Maier & Neustadt

[57] ABSTRACT

A control system for a shift-by-wire automatic transmission, comprises: a first range changing valve for having an input port switched to communicate with a first output port and a second output port; a second range changing valve for causing the first input port connected with the first output port to communicate with two range ports selectively and for causing a second input port connected with the second output port to communicate with at least another of the range ports selectively; and a drive mechanism for switching and operating the first and second range changing valves. Further comprised are: a fail detector for detecting a failure that either of the first range changing valve and the second range changing valve fails to be switched; and a fail controller for outputting an instruction signal to the drive mechanism to change the range by actuating the switchable one of the range changing valves if the fail detector detects the failure.

6 Claims, 11 Drawing Sheets

FIG. 4

| SHIFT POSITION | | SOLENOID VALVE | | | | FRICTIONAL ENGAGEMENT ELEMENT | | | | | | | | | |
|---|---|---|---|---|---|---|---|---|---|---|---|---|---|---|---|
| | | S1 | S2 | S3 | S4 | C1 | C2 | B1 | B2 | F1 | B3 | F2 | C0 | B0 | F0 |
| R | R | — | × | ○ | ○ | × | ○ | × | × | × | ○ | × | ○ | × | × |
| | (N) | — | ○ | ○ | ○ | × | × | × | × | × | × | × | — | × | × |
| N | N | — | — | × | × | × | × | × | × | × | × | × | × | × | × |
| D | 1ST | ○ | × | ○ | × | ○ | × | × | × | × | × | ○ | ○ | × | ○ |
| | 2ND | ○ | ○ | ○ | × | ○ | × | × | ○ | ○ | × | × | ○ | × | ○ |
| | 3RD | × | ○ | ○ | × | ○ | ○ | × | ○ | × | × | × | ○ | × | ○ |
| | 4TH | × | × | ○ | × | ○ | × | × | ○ | × | × | × | × | ○ | × |
| L | 1ST | ○ | × | × | ○ | ○ | × | ○ | ○ | × | ○ | ○ | ○ | × | × |
| S | 2ND | ○ | ○ | × | ○ | ○ | ○ | × | ○ | ○ | × | × | ○ | × | × |
| | 3RD | × | ○ | × | ○ | ○ | × | × | ○ | × | × | × | ○ | × | ○ |
| | 1ST | ○ | × | ○ | × | ○ | × | × | × | × | × | ○ | ○ | × | ○ |

FIG. 8

| SHIFT POSITION | | SOLENOID VALVE | | | | | | FRICTIONAL ENGAGEMENT ELEMENT | | | | | | | | | |
|---|---|---|---|---|---|---|---|---|---|---|---|---|---|---|---|---|---|
| | | S1 | S2 | SLU | S3 | S4 | S5 | C1 | C2 | B1 | B2 | F1 | B3 | F2 | C0 | B0 | F0 |
| P | P | — | ○ | × | × | × | × | × | × | × | × | × | × | × | ○ | × | × |
| | (P) | — | × | ○ | × | × | × | × | × | × | × | × | × | × | × | × | × |
| R | R | — | × | — | ○ | ○ | × | × | ○ | × | × | × | ○ | × | ○ | × | ○ |
| N | N | — | × | × | × | × | × | × | × | × | × | × | × | × | ○ | × | × |
| D | 1ST | ○ | × | — | ○ | × | × | ○ | × | × | × | × | × | ○ | ○ | × | ○ |
| | 2ND | ○ | ○ | — | ○ | × | × | ○ | × | × | ○ | ○ | × | × | ○ | × | ○ |
| | 3RD | × | ○ | — | ○ | × | × | ○ | ○ | × | ○ | × | × | × | ○ | × | ○ |
| | 4TH | × | × | — | ○ | × | × | ○ | ○ | × | ○ | × | × | × | × | ○ | × |
| L | 1ST | ○ | × | × | × | ○ | × | ○ | × | ○ | × | × | ○ | ○ | ○ | × | ○ |
| S | 1ST | ○ | ○ | — | × | ○ | × | ○ | × | × | ○ | ○ | × | × | ○ | × | ○ |
| | 2ND | × | ○ | — | ○ | × | × | ○ | ○ | × | ○ | × | × | × | ○ | × | ○ |
| | 1ST | ○ | × | — | ○ | × | × | ○ | × | × | × | × | × | ○ | ○ | × | ○ |

FIG. 9A

| RANGE | S3 | S4 | S5 |
|---|---|---|---|
| R | O | O | X |
| D | O | X | X |
| ENGINE BRAKE | X | O | X |
| N | X | X | X |

FIG. 9B

| RANGE | S3 | S4 | S5 |
|---|---|---|---|
| R | O | O | X |
| D | O | X | X |
| ENGINE BRAKE | O | X | O |
| N | O | O | O |

FIG. 9C

| RANGE | S3 | S4 | S5 |
|---|---|---|---|
| R | X | X | O |
| D | X | O | O |
| ENGINE BRAKE | X | O | X |
| N | X | X | X |

FIG. 9D

| RANGE | S3 | S4 | S5 |
|---|---|---|---|
| R | O | O | X |
| D | X | O | O |
| ENGINE BRAKE | X | O | X |
| N | O | O | O |

FIG. 9E

| RANGE | S3 | S4 | S5 |
|---|---|---|---|
| R | X | X | O |
| D | O | X | X |
| ENGINE BRAKE | O | X | O |
| N | X | X | X |

FIG. 9F

| RANGE | S3 | S4 | S5 |
|---|---|---|---|
| R | X | X | O |
| D | X | O | O |
| ENGINE BRAKE | O | X | O |
| N | O | O | O |

CONTROL SYSTEM WITH FAILSAFE RANGE PASSAGES IN A CHANGEOVER VALVE FOR SHIFT-BY-WIRE AUTOMATIC TRANSMISSION

This is a division of application Ser. No. 08/011,496 filed on Jan. 29, 1993 now U.S. Pat. No. 5,409,434.

BACKGROUND OF THE INVENTION

The present invention relates to an oil pressure control system for an automatic transmission and, more particularly, to an oil pressure control system for a shift-by-wire automatic transmission for changing the running ranges on the basis of electric signals.

As is well known in the art, an automatic transmission for automobiles is constructed to execute gear changes by changing the engaged/disengaged states of frictional engagement elements such as clutches and brakes with oil pressures. The decisions of the gear changes are generally accomplished on the basis of an engine load represented by a throttle opening and a vehicle speed. These shifting operations based on the running condition are performed for a plurality of forward gear stages. The selection of the running ranges such as a running range for an engine braking at middle or low gear stages, a reverse range or a neutral range is generally carried out in the prior art by operating a shift lever manually.

On the other hand, there has been proposed in recent years an automatic transmission which is constructed to select the running ranges electrically by switching actions. According to this construction, valves for switching the running ranges are actuated by energizing predetermined actuators by the switching actions. The system of this kind is generally equipped with fail-safe means, i.e., means for coping with failures in the electric system or the valve mechanism. For example, Japanese Patent Laid-Open No. 184249/1987 discloses a system equipped with an emergency valve. This system, as disclosed, is constructed to execute the gear changes by operating a rotary valve with a motor. The emergency valve is disposed in parallel with that rotary valve so that the oil pressure may be fed through the emergency valve to predetermined frictional engagement elements by blocking the feed of the oil pressure to the rotary valve if the rotary valve is troubled.

The system having the aforementioned emergency valve of the prior art is enabled to set predetermined one of gear stages by engaging the predetermined frictional engagement elements fed with the oil pressure through the emergency valve, even if the rotary valve for executing the gear changes fails to operate normally. However, the gear stage to be thus set is limited to the predetermined one of the forward gear stages so that the system cannot always allow the running according to the various changing situations such as the road condition even if it can effect the forward running. Thus, the system of the prior art is inferior in utility.

On the other hand, Japanese Patent Publication No. 25505/1977 discloses a system for deciding a failure in the control lines in terms of the logic between detected oil pressures and electric signals so that a safe state may be maintained by stopping the engine if the failure takes place.

According to the system described above, the vehicle itself is stopped, if the control line is troubled, so that the safety can be negatively maintained. With the engine being stopped, however, the vehicle cannot run any more. As a result, the vehicle can neither relieve itself positively to a safer state nor use a still valid control line, if any, effectively for a continuous run. Thus, this system cannot always be said to be sufficient either for the so-called "positive failsafe".

SUMMARY OF THE INVENTION

A main object of the present invention is to enable a vehicle to run even if a failure occurs in the vehicle mechanism for changing the running ranges.

Another object of the present invention is to make it possible to set a forward running range and a neutral range if a failure occurs in a range changing mechanism.

According to the present invention, therefore, there is provided a control system for a shift-by-wire automatic transmission, which comprises: a first range changing valve for having an input port switched to communicate with a first output port and a second output port; a second range changing valve for causing the first input port connected with said first output port to communicate with two range ports selectively and for causing a second input port connected with said second output port to communicate with at least another of said range ports selectively; and drive means for switching and operating said first and second range changing valves, wherein the improvement comprises: fail detecting means for detecting a failure that either of said first range changing valve and said second range changing valve fails to be switched; and fail control means for outputting an instruction signal to said drive means to change the range by actuating the switchable one of said range changing valves if said fail detecting means detects said failure.

Said second range changing valve includes: a reverse range port for outputting an oil pressure to set a reverse stage; and a forward range port adapted to communicate with said first input port or said second input port simultaneously with said reverse range port for outputting an oil pressure to set a forward stage, and said control system further comprises a shut-off valve for selectively stopping the oil pressure outputted from said reverse range port.

According to the present invention, moreover, there is provided a control system for a shift-by-wire automatic transmission, which comprising a range changing mechanism including two range changing valves connected in series with each other and adapted to output an oil pressure selectively to a plurality of range setting oil passages, wherein the improvement comprises a change-over valve including at least input ports connected with said range changing mechanism and at least two output ports connected with two of said range setting oil passages, for alternating or changing the communicating states of said input ports and said output ports.

The control system further comprises: solenoid valve for operating said range changing valve; another solenoid valve for operating said change-over valve; ON/OFF determining means for determining the ON/OFF states of said solenoid valves to set a selected range; output means for outputting a signal to the individual ones of said solenoid valves to make such an ON/OFF combination of said solenoid valves as is determined by said ON/OFF determining means; detecting means for detecting the output state of the oil pressure to said range setting oil passages; range deciding means for deciding the range on the basis of the detected result of said detecting means; and fail deciding means for instructing said ON/OFF deciding means to change the ON/OFF combination of said solenoid valves so as to set said selected range if the range decided by said range deciding means and said selected range are different.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 4 is a clutch/brake application chart of frictional engagement device of the automatic transmission;

FIG. 8 is a clutch/brake application chart of frictional engagement device of the automatic transmission which is equipped with the oil pressure circuit shown in FIGS. 5 to 7;

FIGS. 9A to 9F are charts tabulating the ON/OFF states of third to fifth solenoid valves in case any of solenoid valves for setting one of ranges happens to fail;

DETAILED DESCRIPTION OF THE PREFERRED EMBODIMENT

Figure 1:
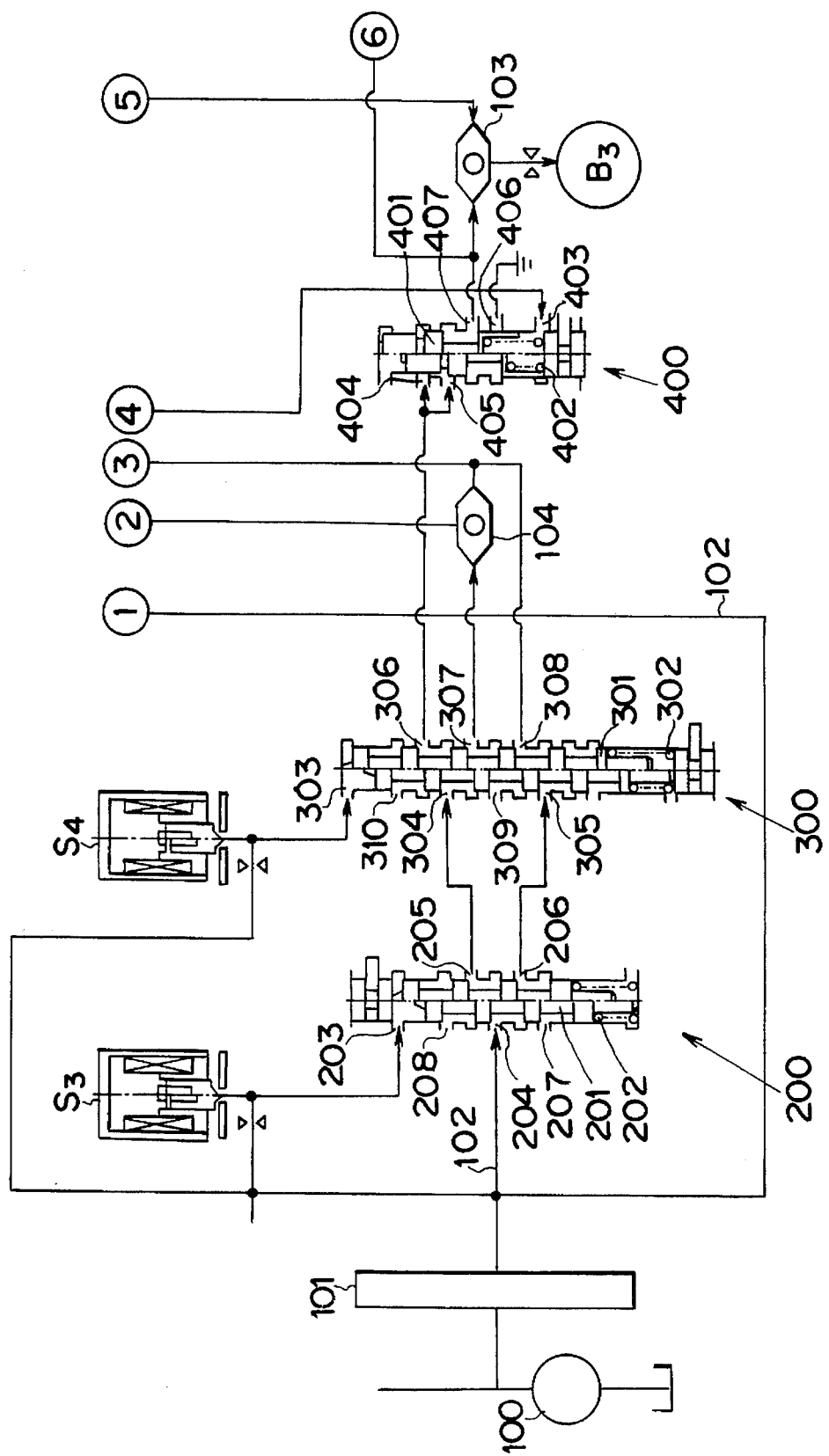
FIG. 1 is a diagram showing a portion of an oil pressure circuit in an automatic transmission to which is applied the present invention.
Figure 2:
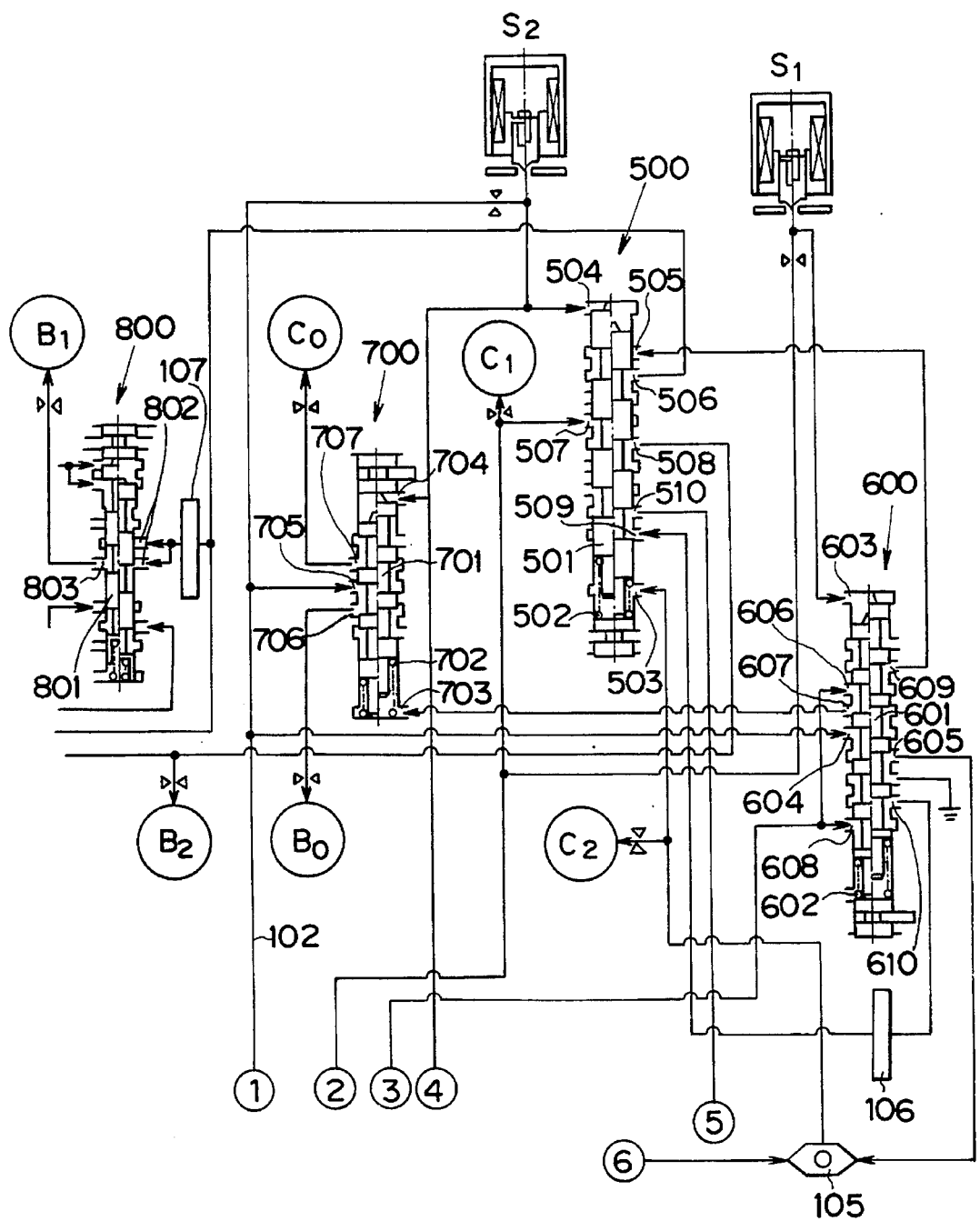
FIG. 2 is a diagram showing the remaining portion of the oil pressure circuit.
Figure 3:
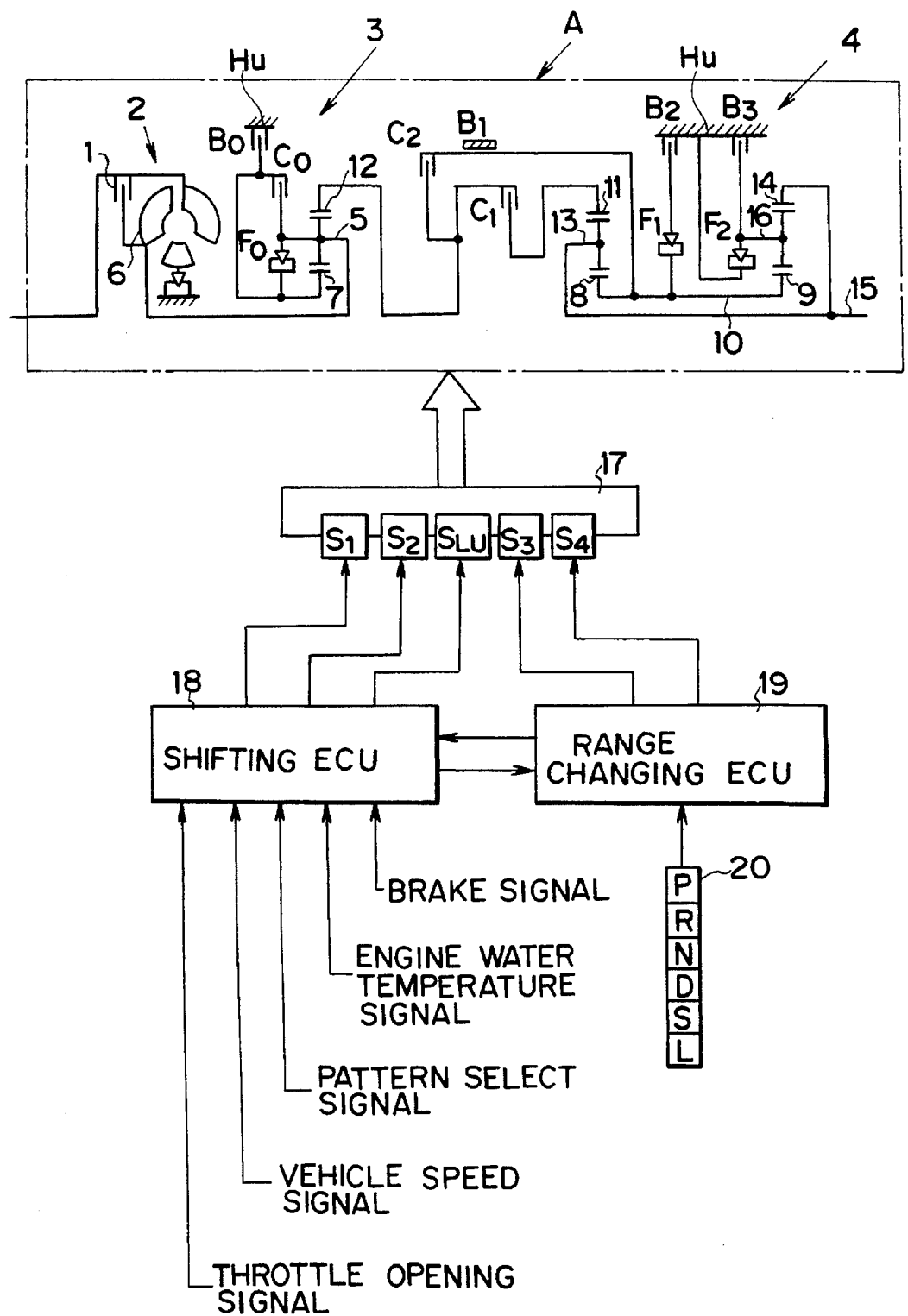
FIG. 3 is a block diagram showing an overall construction of an automatic transmission to which is applied the present invention.

The present invention will be described in the following in connection with the embodiments thereof with reference to the accompanying drawings. FIGS. 1 and 2 are oil pressure circuit diagrams showing a main portion of a hydraulic control system according to the present invention. The hydraulic control system, as shown, is applied to a shift-by-wire automatic transmission shown in FIG. 3. The automatic transmission, as generally designated at A in FIG. 3, is equipped as its shifting mechanism with: a torque converter 2 having a lockup clutch 1; a second shifting unit 3 having a set of planetary gear mechanism; and a first shifting unit 4 for setting a plurality of forward gear stages and a reverse gear stage by means of two sets of planetary gear mechanisms.

The second shifting unit 3 is provided for changing two high and low gear stages and is equipped with a planetary gear mechanism which has its carrier 5 connected to a turbine runner 6 of the torque converter 2. Between the carrier 5 and a sun gear 7, there are arranged a clutch $C_0$ and a one-way clutch $F_0$ in parallel with each other. A brake $B_0$ is interposed between the sun gear 7 and a housing Hu.

The individual planetary gear mechanisms of the first shifting unit 4 have their sun gears 8 and 9 fixed on a common sun gear shaft 10. A first clutch $C_1$ is interposed between a ring gear 11 in the planetary gear mechanism, as located at the lefthand (or front) side of FIG. 3, of the first shifting unit 4 and a ring gear 12 in the second shifting unit 3. A second clutch $C_2$ is interposed between the aforementioned sun gear shaft 10 and the ring gear 12 of the second shifting unit 3. A carrier 13 of the lefthand side planetary gear mechanism in the first shifting unit 4 and a ring gear 14 of the righthand (or rear) side planetary gear mechanism are connected to each other and to an output shaft 15.

A first brake $B_1$ consisting of a band brake is provided for stopping the rotation of the sun gear shaft 10. More specifically, the first brake $B_1$ is disposed around the outer circumference of the clutch drum of the second clutch $C_2$. A first one-way clutch $F_1$ and a second brake $B_2$ are arranged in series between the sun gear shaft 10 and the housing Hu. A second one-way clutch $F_2$ and a third brake B3 are arranged in parallel between a carrier 16 in the rear side planetary gear mechanism and the housing Hu.

An oil pressure control unit 17 for pumping an oil pressure to and from the aforementioned individual clutches $C_0$, $C_1$ and $C_2$ and the aforementioned individual brakes $B_0$, $B_1$, $B_2$ and $B_3$ is equipped with: first and second solenoid valves $S_1$ and $S_2$ for effecting 1st to 4th speeds; a linear solenoid valve $S_{LU}$ for controlling the lockup clutch 1; and third and fourth solenoid valves $S_3$ and $S_4$ for changing the running ranges. There are provided: a shifting electronic control unit (as will be tentatively referred to as the "shifting ECU") 18 for controlling the first and second solenoid valves $S_1$ and $S_2$ and the liner solenoid valve $S_{LU}$ of the above-specified solenoid valves; and a running range changing electronic control unit (as will be tentatively referred to as the "range changing ECU") 19 for controlling the third and fourth solenoid valves $S_3$ and $S_4$ to change the running ranges. Each of these ECUes 18 and 19 is constructed mainly of a central processing unit (i.e., CPU), memory elements and input/output interfaces. The shifting ECU 18 is fed, like the conventional one, with a variety of signals including a throttle opening signal, a vehicle speed signal, a pattern select signal, an engine water temperature signal and a brake signal. On the basis of these input signals and a shift map stored in advance, the shifting ECU 18 computes to determine a gear stage to be set and outputs its signals to the first and second solenoid valves $S_1$ and $S_2$ and the 11near solenoid valve $S_{LU}$ to effect that gear stage.

On the other hand, the range changing ECU 19 is connected with a range selecting switch 20 for selecting one of a parking (P) range, a reverse (R) range, a neutral (N) range, a drive (D) range, an S range and an L range, and turns ON and OFF the third and fourth solenoid valves $S_3$ and $S_4$ so as to effect the running range which is selected in the range selecting switch 20. Simultaneously with this, the range changing ECU 19 outputs a range position signal to the shifting ECU 18 and a range indicator (although not shown). Moreover, the range changing ECU 19 is fed from the shifting ECU 18 with a shift signal indicating one gear stage.

The aforementioned oil pressure control unit 17 is equipped with an oil pressure circuit shown in FIGS. 1 and 2. Incidentally, circled numerals appearing in FIGS. 1 and 2 indicate that the lines designated at the identical numerals are connected with each other. As shown in FIG. 1, there are provided two range changing valves 200 and 300 for changing the running ranges. The first range changing valve 200 is equipped with a spool 201 having four lands and a spring fitted at one end portion (or at the lower end portion, as shown) of the spool 201. To a control port 203 at the end portion of the spool 201, as opposed to the end portion equipped with that spring 202, there is connected the third solenoid valve $S_3$. This third solenoid valve $S_3$ feeds and releases such a line pressure $P_L$ to and from the control port 203 as is established by regulating an oil pressure pressurized by an oil pressure pump 100 by a primary regulator valve 101. Specifically, the third solenoid valve $S_3$ closes its drain port, when turned OFF, to establish the line pressure $P_L$ and opens the drain port, when turned ON, to release it from the control port 203. Moreover, the first range changing valve 200 causes an input port 204 connected with a line pressure oil passage 102 to communicate with a first output port 205 and a second output port 206 to communicate with a drain port 207, when its spool 201 is urged to a position, as indicated at a righthand half of FIG. 1, by the spring 202 as a result that the third solenoid valve $S_3$ is ON. On the other hand, when the spool 201 is in a position, as indicated at a lefthand half of FIG. 1 against the elastic force of the spring 202 as a result that the third solenoid valve $S_3$ is OFF, the first range changing valve 200 causes the input port 204 to communicate with the second output port 206 and the first output port 205 to communicate with a drain port 208.

On the other hand, the second range changing valve 300 is equipped with a spool 301 having six lands and a spring 302 arranged at one end portion of the spool 301. To a control port 303 which is formed at an end portion opposed to that spring 302, there is connected the fourth solenoid valve $S_4$. This fourth solenoid valve $S_4$ is provided for feeding and releasing the line pressure $P_L$ to and from the control port 303. Like the aforementioned third solenoid valve $S_3$, the fourth solenoid valve $S_4$ closes its drain port, when it is OFF, to establish the line pressure $P_L$ and opens the drain port, when it is ON, to release it from the control port 303. Moreover, the second range changing valve 300 is formed with: two input ports—a first input port 304 connected to the first output port 205 in the first range changing valve 200, and a second input port 305 connected with the second output port 206 in the first range changing valve 200; and three output ports—an R-range port 306, a D-range port 307 and an engine braking port 308. When the spool 301 is in a position, as indicated at a righthand half of FIG. 1, as a result that the fourth solenoid valve $S_4$ is ON, the second range changing valve 300 provides the communication between the first input port 304 and the R-range port 306, the communication between the second input port 305 and the engine braking port 308, and the communication between the D-range port 307 and a drain port 309. On the other hand, when the spool 301 is in a position, as indicated at a lefthand half of FIG. 1, as a result that the fourth solenoid valve $S_4$ is OFF, the second range changing valve 300 provides the communication between the first input port 304 and the D-range port 307 and causes the R-range port 306 and the engine braking port 308 to communicate with a drain port 310 and the drain port 309, respectively.

The aforementioned R-range port 306 is connected with a shut-off valve 400. This shut-off valve 400 selectively shuts off the oil pressure to the third brake $B_3$, which is engaged to set the reverse stage, thereby to inhibit the reverse stage selectively. The shut-off valve 400 is arranged with both a spring 402 at one end portion of its spool 401 and is formed with a hold port 403 at its end portion arranged with the spring 402 and a control port 404 for establishing the oil pressure to push the spool 401 toward the hold port 403. Moreover: the aforementioned R-range port 306 is connected with that control port 404 and an input port 405; the second solenoid valve $S_2$ is connected with the hold port 403; and an output port 407 for communicating with the input port 405 and a drain port 406 in a switching manner is connected with the third brake $B_3$ through a check ball valve 103 having two input ports and one output port.

Moreover, the D-range port 307 and the engine braking port 308 in the second range changing valve 300 are respectively connected with the individual input ports of a check ball valve 104 having two input ports and one output port. This output port of the check ball valve 104 is connected with the first clutch $C_1$.

There are further provided a 1-2 shift valve 500, a 2-3 shift valve 600, a 3-4 shift valve 700 and a cut-off valve 800. These valves are used for effecting the forward 1st to 4th gear stages and are basically made to have constructions similar to those of the prior art. Specifically, the 1-2 shift valve 500 is arranged with a spring 502 at one end of a spool 501 having four lands and is formed both a hold port 503 at the end portion arranged with that spring 502 and a control port 504 at the end portion opposed to the hold port 503. This control port 504 is connected with the second solenoid valve $S_2$. This second solenoid valve $S_2$ is provided for feeding and releasing the line pressure $P_L$ coming from the line pressure passage 102. The second solenoid valve $S_2$ opens the drain port to release that pressure, when turned ON, and closes the drain port, when turned OFF, to establish the line pressure $P_L$ between the control port 504 of the 1-2 shift valve 500 and the hold port 403 of the aforementioned shut-off valve 400. When the second solenoid valve $S_2$ is turned ON or when the line pressure $P_L$ is applied to the hold port 503, the spool 501 of the 1-2 shift valve 500 is positioned, as indicated at a lefthand half of FIG. 2. As a result: a first input port 505 communicates with a first brake port 506; a second input port 507 connected with the output port of the aforementioned check ball valve 104 communicates with a second brake port 508; a third input port 509 is closed; and a third brake port 510 communicates with the drain port. Moreover, when the pressure is released from the hold port 503 and when the second solenoid valve $S_2$ is turned OFF, the spool 501 of the 1-2 shift valve 500 is positioned in a righthand half of FIG. 2. As a result, the first input port 505 and the second input port 507 are closed, and the third input port 509 communicates with the third brake port 510. Furthermore: the first brake port 506 is connected with the cut-off valve 800; the second brake port 508 is connected with the second brake $B_2$; and the third brake port 510 is connected with the third brake $B_3$ through the aforementioned check ball valve 103.

The 2-3 shift valve 600 is switched in operation by the first solenoid valve $S_1$. The 2-3 shift valve 600 is arranged with a spring 602 at one end portion of a spool 601 having six lands and is formed with a control port 603 at the end portion opposed to the spring 602. The control port 603 is connected with the first solenoid valve $S_1$. This first solenoid valve $S_1$ feeds to and releases from the control port 603 the oil pressure which is fed through the check ball valve 104 from the D-range port 307 or the engine braking port 308 of the aforementioned second range changing valve 300. The first solenoid valve $S_1$ has its drain port closed, when turned OFF, to establish the line pressure $P_L$ in the control port 603 and its drain port opened, when turned ON, to release it from the control port 603. When the 2-3 shift valve 600 receives the line pressure $P_L$ at its control port 608 to have its spool 601 pushed down to a position, as indicated at a lefthand half of FIG. 2, it establishes the communication between a first input port 604 connected with the line pressure passage 102 and a clutch port 605 and causes a second input port 606 connected with the engine braking port 308 of the aforementioned second range changing valve 300 to communicate with a hold output port 607. The 2-3 shift valve 600 further closes a third input port 608 which is connected with the aforementioned engine braking port 308. On the other hand, when the control port 603 is relieved so that the spool 601 is pushed down to a position, as indicated at a righthand half of FIG. 2: the first input port 604 communicates with the hold output port 607; the second input port 606 communicates with a first brake port 609; and the third input port 608 communicates with a second brake port 610. Of these ports: the first brake port 609 is connected with the first input port 505 of the 1-2 shift valve 500; the clutch port 605 is connected with the second clutch $C_2$ and the hold port 503 of the 1-2 shift valve 500 through a check ball valve 105 having two input ports and one output port, and the second brake port 610 is connected through the modulator valve 106 with the third input port 509 of the 1-2 shift valve 500. Incidentally, the other input port of the check ball valve 105 is connected with the output port 407 of the shut-off valve 400.

The 3-4 shift valve 700 is equipped with a spool 701 having four lands and a spring 702 which is arranged at one end portion of the spool 701. The 3-4 shift valve 700 is formed, at the end portion arranged with the spring 702, with a hold port 703 connected with the hold output port 607 in the aforementioned 2-3 shift valve 600 and, at the opposite end portion, with a control port 704 connected with the aforementioned second solenoid valve $S_2$. Moreover, when the hold port 703 is relieved and when the line pressure $P_L$ is established in the control port 704, the spool 701 is pushed down to a position, as indicated at the lefthand half of FIG. 2, so that an input port 705 connected with the line pressure passage 102 communicates with a brake port 706 connected with the brake $B_0$. When the control port 704 is relieved, the spool 701 is pushed down to a position, as indicated at a lefthand half of FIG. 2, so that the input port 705 communicates with a clutch port 707 connected with the clutch $C_0$.

The cut-off valve 800 has its spool 801 pushed down to a position, as indicated at a righthand half of FIG. 2, as the throttle pressure rises according to the throttle opening, thereby to reduce the area of a passage leading from an input port 802 to an output port 803. The input port 802 is connected through a modulator valve 107 with the first brake port 506 of the 1-2 shift valve 500. Moreover, the output port 803 is connected with the first brake $B_1$.

In the automatic transmission equipped with the oil pressure control system thus far described, the individual frictional engagement elements are engaged or disengaged to set one of the gear stages, as tabulated in the clutch/brake application chart of FIG. 4 by turning ON/OFF the first to fourth solenoid valves $S_1$ to $S_4$, as tabulated in the clutch/brake application chart of FIG. 4. In FIG. 4: for the solenoid valves, symbols o indicate "ON", symbols x indicate "OFF", and the remaining symbols indicate either "ON" or "OFF"; and for the frictional engagement elements, the symbols o indicate the engaged states, the symbols x indicate the disengaged states, and the remaining symbols indicate either the engaged states or the disengaged states.

In the oil pressure control system described above, as is apparent from FIG. 4, the running ranges are determined by the combinations of the ON/OFF of the third solenoid valve $S_3$ and the fourth solenoid valve $S_4$, and the R-range can be forcibly changed into the N-range by the second solenoid valve $S_2$.

When the R-range is selected by the aforementioned range selecting switch 20, both the third solenoid valve $S_3$ and the fourth solenoid valve $S_4$ are turned ON, and the second solenoid valve $S_2$ is turned OFF if no special trouble occurs. As a result, the first range changing valve 200 is relieved from its control port 203 to have its spool 201 released up the position indicated at the righthand half of FIG. 1, so that the oil pressure is outputted from the first output port 205. Moreover, the second range changing valve 300 is relieved from its control port 303 to have its spool 301 pushed up to the position indicated at the righthand half of FIG. 1. This causes the first input port 304 fed with the oil pressure from the first output port 205 of the first range changing valve 200 to communicate with the R-range port 306 so that the oil pressure is fed from the R-range port 306 to the control port 404 and the input port 405 of the shut-off valve 400. If, in this case, the second solenoid valve $S_2$ is OFF because of no special trouble, the shut-off valve 400 receives the line pressure $P_L$ at its hold port 403 so that its spool 401 is pushed up to the position indicated at the righthand half of FIG. 1. As a result, the input port 405 communicates with the output port 407, from which the oil pressure is fed through the check ball valve 103 to engage the third brake $B_3$. Moreover, since the output port 407 of the shut-off valve 400 is connected through another check ball valve 105 with the second clutch $C_2$, this second clutch $C_2$ is also engaged by the oil pressure fed thereto. In short, the three elements—the second clutch $C_2$, the third brake $B_3$ and the clutch $C_0$—are engaged to set the reverse stage.

If, in this reverse stage setting state, the third solenoid valve $S_3$ or the fourth solenoid valve $S_4$, or either of the range changing valves 200 and 300 is troubled, the second solenoid valve $S_2$ is changed into its ON state. As a result, the shut-off valve 400 is relieved from its hold port 408 so that its spool 401 is pushed down to the position, as indicated at the lefthand half of FIG. 1, by the oil pressure acting in the control port 404. In accordance with this, the input port 405 is closed, and the output port 407 communicates with the drain port 406, so that the second clutch $C_2$ and the third brake $B_3$ are relieved into their disengaged states. In short, the neutral stage is established, or the reverse stage is inhibited.

On the other hand, when the N-range is selected by the range selecting switch 20, the third and fourth solenoid valves $S_3$ and $S_4$ are turned OFF. Therefore, the first range changing valve 200 has its spool 201 pushed down to the position, as indicated at the lefthand half of FIG. 1, by the line pressure $P_L$ acting upon the control port 203. As a result, the input port 204 communicates with the second output port 206, from which the oil pressure is outputted. However, the second range changing valve 300 has its spool 301 pushed down to the position, as indicated at the lefthand half of FIG. 1, by the oil pressure acting in the control port 303, so that the second input port 305 fed with the oil pressure from the first range changing valve 200 is left closed. In other words, no oil pressure is outputted from the second range changing valve 300 to leave the first clutch $C_1$ and the third brake $B_3$ disengaged. Thus, no torque is transmitted to the output shaft 15 so that the neutral state prevails.

When the D-range is selected by the range selecting switch 20, the third solenoid valve $S_3$ is turned ON, but the fourth solenoid valve $S_4$ is turned OFF. In the first range changing valve 200, therefore, the oil pressure is outputted from the first output port 205 as in the aforementioned case of the R-range. On the other hand, the second range changing valve 300 has its spool 301 pushed down, as indicated at the lefthand half of FIG. 1, as in the aforementioned case of the N-range, so that the first input port 304 fed with the oil pressure from the first range changing valve 300 communicates with the D-range port 307 to output the oil pressure therefrom. As a result, the first clutch $C_1$ is fed with the oil pressure through the check ball valve 104 and is engaged so that one of the 1st to 4th speeds is set according to the states of the individual shift valves 500, 600 and 700. In this case, the engine braking is ineffective at the 1st and 2nd speeds. This will be explained in the following. The first brake $B_1$ having a parallel relation to the first one-way clutch $F_1$ and the third brake $B_3$ having a parallel relation to the second one-way clutch $F_2$ are made, as shown in FIGS. 1 and 2, to communicate with the engine braking port 308 of the second range changing valve 300 through the 1-2 shift valve 500 and the 2-3 shift valve 600. As a result, the engine braking port 308 is in communication with the drain port 309, while the D-range is being selected, so that the first brake $B_1$ and the third brake $B_3$ are kept away from the engagement to leave the engine braking action ineffective.

On the other hand, when the L-range is selected by the range selecting switch 20, the third solenoid valve $S_3$ is turned OFF, but the fourth solenoid valve $S_4$ is turned ON. As a result, the first range changing valve 200 outputs the oil pressure from the second output port 206 as in the case of the N-range. On the other hand, the second range changing valve 300 has its spool 301 pushed down to the position, as indicated at the lefthand half of FIG. 1, as in the case of the R-range. As a result, the second input port 305 fed with the oil pressure from the first range changing valve 200 communicates with the engine braking port 308 so that the oil pressure is outputted from the engine braking port 308. Since this engine braking port 308 is connected through the check ball valve 104 through the first clutch $C_1$, this first clutch $C_1$ is engaged. Moreover, the engine braking port 308 is made, as described above, to communicate with the first brake $B_1$ and the third brake $B_3$ through the 1-2 shift valve 500 and the 2-3 shift valve 600. As a result, when the first solenoid valve $S_1$ is turned ON whereas the second solenoid valve $S_2$ is turned OFF to set the 1st speed, the 1-2 shift valve 500 takes the state, as indicated at the righthand half of FIG. 2, and the 2-3 shift valve 600 takes the state, as shown at the righthand half of FIG. 2, so that the third brake $B_3$ is engaged by the oil pressure fed thereto. In short, at the time of setting the 1st speed, not only the second one-way clutch $F_2$ but also the third brake $B_3$ applies its reaction to the rear side carrier 16 of the first shifting unit 4, so that the engine braking action can be effected at the 1st speed.

On the other hand, when the S-Range is selected by the range selecting switch 20, the third solenoid valve $S_3$ is turned ON whereas the fourth solenoid valve $S_4$ is turned OFF at the 1st speed as in the D-range. At the 2nd and 3rd speeds, however, the third solenoid valve $S_3$ is turned OFF whereas the fourth solenoid valve $S_4$ is turned ON. In the S-Range, therefore, the state of the 1st speed is similar to that when the D-range is selected, so that the engine braking action is ineffective in that particular gear stage. At the 2nd speed, however, the oil pressure is outputted from the engine braking port 308 as in case the L-range is selected. When the first solenoid valve $S_1$ and the second solenoid valve $S_2$ are turned ON to set the 2nd speed, the first brake $B_1$ is engaged by the oil pressure fed thereto. In short, at the time of setting the 2nd speed, not only the first one-way clutch $F_1$ but also the first brake $B_1$ applies its reaction to the aforementioned sun gear shaft 10 so that the engine braking action can be effected.

In the range changing mechanism shown in FIG. 1, as described above, the ranges are selected by operating the two range changing valves 200 and 300. Even if, therefore, any of the range changing valves 200 and 300 or any of the solenoid valves $S_3$ and $S_4$ for actuating the former valves fails, one of the gear stages and the neutral state can be set to effect the so-called "limp home". As will be readily understood by those skilled in the art, the failure of a solenoid and/or a range changing valve can be detected by known electrical and/or pressure sensors, which are not per se part of the present invention in and of themselves. For example, as described hereinafter with reference to FIG. 11, where an oil pressure for a selected running range does not correspond to the actual detected running range, or more particularly the detected oil pressure signal from oil pressure sensors, it is determined that a failure has occurred. This decision can be electrically executed by an electronic control unit (ECU) as will be readily understood by those skilled in the art. Specifically, in case of a failure in which the first range changing valve 200 cannot be switched, the oil pressure is outputted only from either the first output port 205 or the second output port 206. If the oil pressure is outputted exclusively from the first output port 205, the oil pressure can be outputted from the R-range port 306 and the D-range port 307 changed by the second range changing valve 300, and the reverse stage is inhibited by the shut-off valve 400. On the other hand, if the oil pressure is outputted exclusively from the second output port 206, the oil pressure can be outputted from the engine braking port 308 changed by the second range changing valve 300, or the output of the oil pressure can be stopped. As a result, any two of the D-range, the S-range, the L-range and the N-range can be set to run the vehicle at the plurality of forward stages.

On the other hand, if either the second range changing valve 300 or the fourth solenoid valve $S_4$ for actuating the former fails to have its spool 301 fixed in either of the righthand and lefthand halves of FIG. 1, it is possible to set either the R-range and the engine braking range or the D-range and the N-range. If the spool 301 is fixed in the position, as indicated at the righthand half of FIG. 1, the oil pressure can be fed by actuating the first range changing valve 200 so that it can be outputted from the R-range port 306 and the engine braking port 308. In this case, the reverse stage is inhibited by the shut-off valve 400. On the other hand, if the spool 301 is fixed in the position, as indicated at the lefthand half of FIG. 1, the oil pressure is either outputted from the D-range port 307 by switching the first range changing valve 200 or not in the least, so that the N-range can be established. As a result, the system thus far described can effect a forward running under various conditions even if the range changing mechanism should fail.

Here will be described an embodiment, in which a change valve 420 is disposed at the output side of the second range changing valve 300 so that the vehicle may be able to run even when either of the range changing valves 200 and 300 fails. In the embodiment to be described in the following, the members identical to those of the foregoing embodiment will not be described by designating them at the common reference characters.

Figure 5:
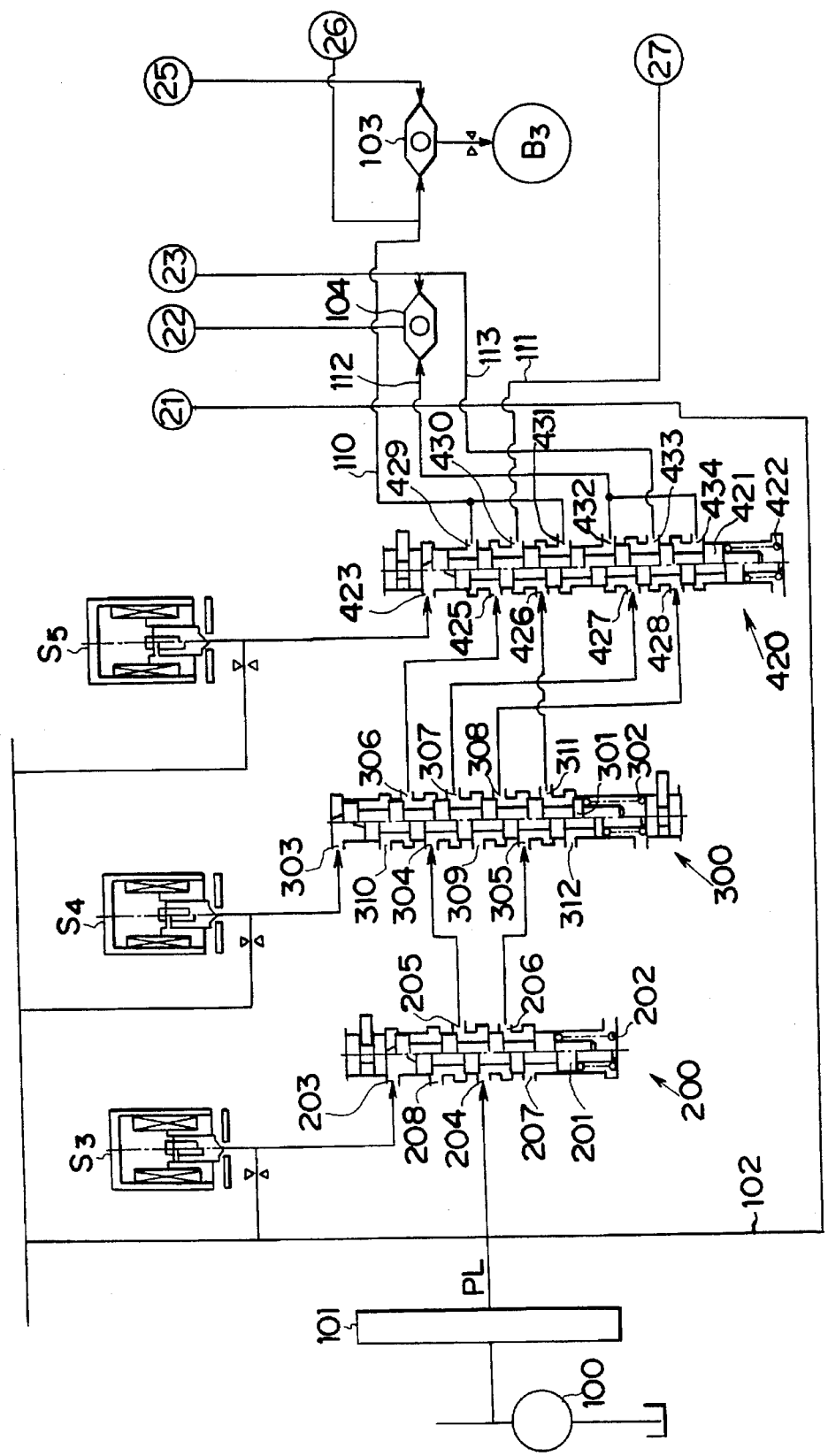
FIG. 5 is a diagram showing a portion of another oil pressure circuit to which is applied the present invention.
Figure 6:
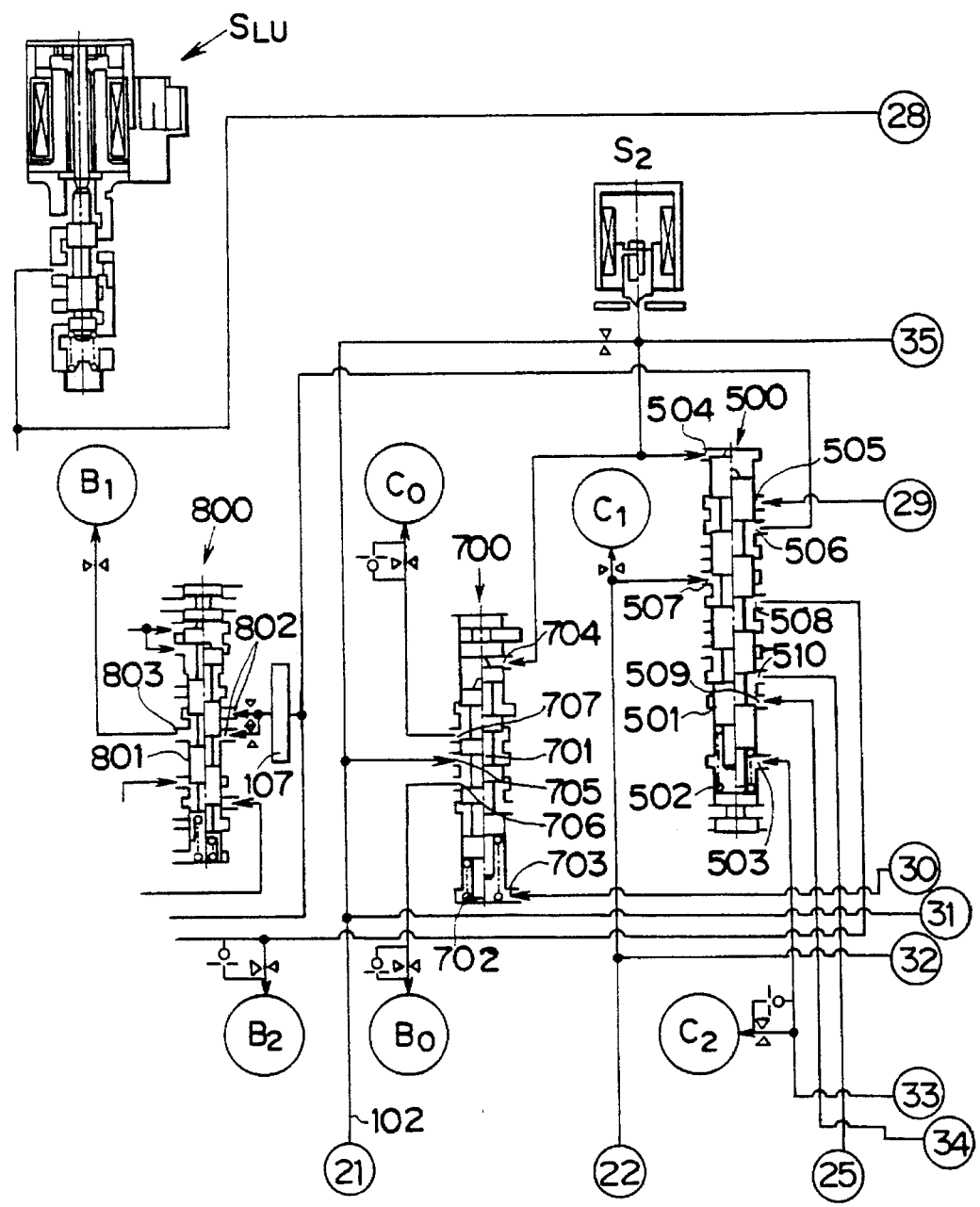
FIG. 6 is a diagram showing a remaining portion of the oil pressure circuit.
Figure 7:
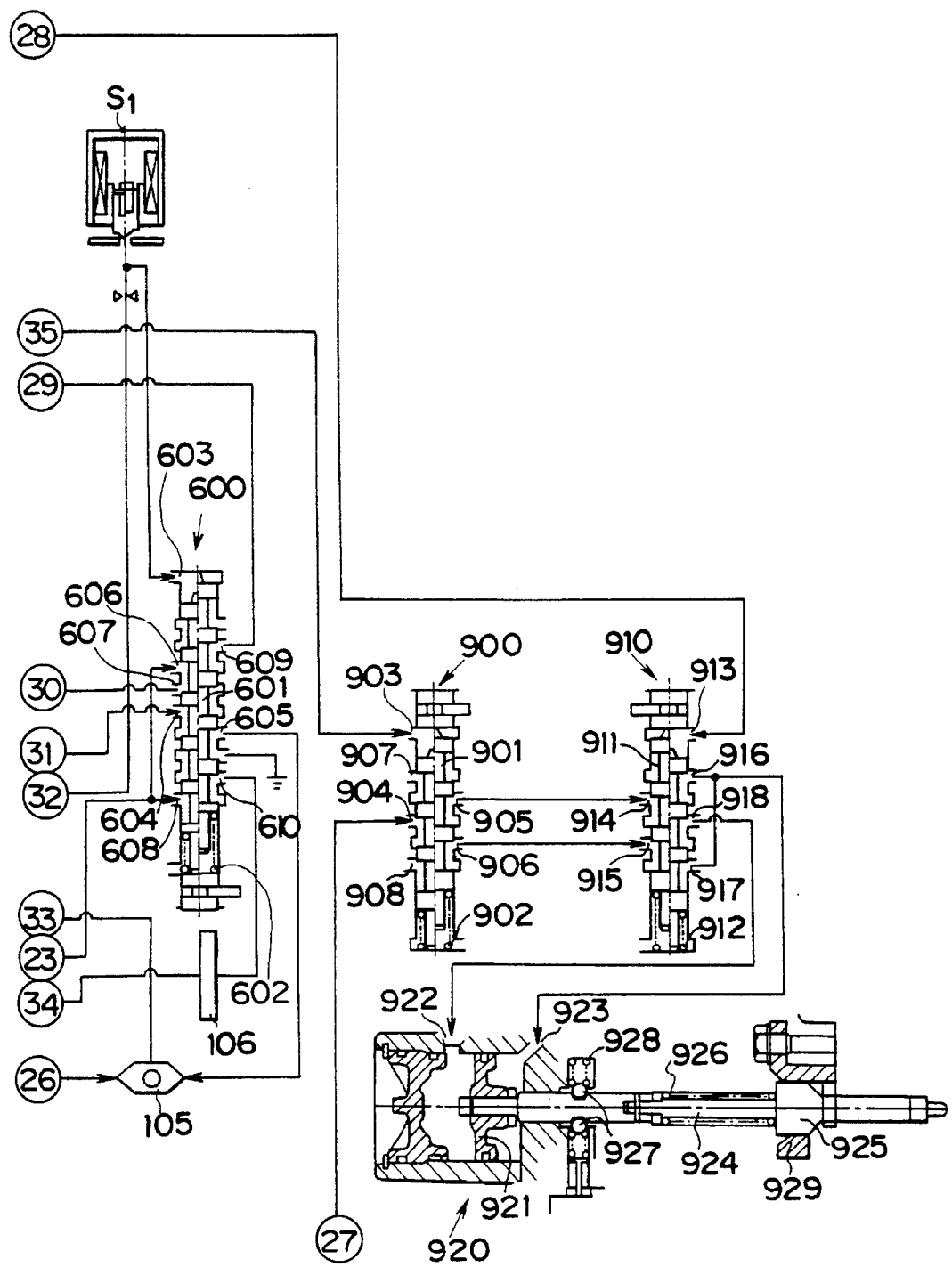
FIG. 7 is a diagram showing another remaining portion of the oil pressure circuit.

An oil pressure circuit shown in FIGS. 5 to 7 is applied to the shift-by-wire automatic transmission shown in FIG. 3. The second range changing valve 300 is formed below the aforementioned second input port 305 with a parking port 311 and a drain port 312. The individual output ports of the second range changing valve 300 are connected with the respectively corresponding input ports of the change valve 420. This change valve 420 is provided for having their predetermined two input ports connected with the output side oil passages by reversing, alternating or changing them. The change valve 420 is equipped with a spool 421 having seven lands. This spool 421 is pushed in the axial direction by a spring 422 which is arranged at one end portion thereof. A fifth solenoid valve $S_5$ is connected with a control port 423 which is formed in the end portion opposed to the spring 422. The fifth solenoid valve $S_5$ closes the drain port, when in its OFF state, to establish the line pressure $P_L$ in the control port 423 and opens the drain port, when in its ON state, to relieve the control port 423. When the fifth solenoid valve $S_5$ is in the OFF state, it takes a first state in which its spool 421 is pushed down to a position, as indicated at the lefthand half of FIG. 5. On the other hand, when the fifth solenoid valve $S_5$ is in the ON state, it takes a second state in which the spool 421 is pushed up to a position, as indicated at the righthand half of FIG. 5. Incidentally, the fifth solenoid valve $S_5$ is turned ON/OFF by the range changing ECU 19.

The change valve 420 is further formed as its input ports with first to fourth input ports 425, 426, 427 and 428 which are ordered sequentially downward at the lefthand side of FIG. 5. The first input port 425 is connected with the R-range port 306 of the second range changing valve 300; the second input port 426 is connected with the parking port 311 of the second range changing valve 300; the third input port 427 is connected with the D-range port 307 of the second range changing valve 300; and the fourth input port 428 is connected with the engine braking port 308 of the second range changing valve 300. The change valve 420 is additionally formed as its output ports with six ports—a first R-port 429, a parking port 430, a second R-port 431, a first D-port 432, an engine braking port 433 and a second D-port 434, all of which are located sequentially downward at the righthand side of FIG. 5. When the change valve 420 takes its first state in which its spool 421 is pushed down to a position, as indicated at the lefthand half of FIG. 5: the first input port 425 communicates with the first R-port 429; the second input port 426 communicates with the parking port 430; the third input port 427 communicates with the first D-port 432; and the fourth input port 428 communicates with the engine braking port 433. On the other hand, when the change valve 420 takes its second state in which its spool 421 is pushed up to a position, as indicated at the righthand half of FIG. 5: the first input port 425 communicates with the parking port 430; the second input port 426 communicates with the second R-port 431; the third input port 427 communicates with the engine braking port 433; and the fourth input port 428 communicates with the second D-port 434.

Moreover: an R-range oil passage 110 is connected with the first and second R-ports 429 and 431; a parking range oil passage 111 is connected with the parking port 430; a D-range oil passage 112 is connected with the first and second D-ports 432 and 434; and an engine braking range oil passage 113 is connected with the engine braking port 433. Specifically, the change valve 420 connects the R-range oil passage 110 and the parking range oil passage 111 as they are or alternately with the R-range port 306 and the parking port 311 of the second range changing valve 300, respectively, and the D-range oil passage 112 and the engine braking range oil passage 113 as they are or alternately with the D-port 307 and the engine braking port 308 of the second range changing valve 300, respectively.

The aforementioned R-range oil passage 110 is connected with the third brake $B_3$ through the check ball valve 103 having two input ports and one output port and further with one input port in another check ball valve 105 having two input ports and one output port, as shown in FIG. 7. Moreover, the D-range oil passage 112 and the engine braking range oil passage 113 are respectively connected with the two input ports in another check ball valve 104, which has its output port connected with the first clutch $C_1$.

Next, a parking lock mechanism will be described in the following. This parking lock mechanism is equipped with: two valves—a control valve 900 and a change valve 910; and an oil pressure servo 920. The control valve 900 outputs the oil pressure, which is fed thereto when the parking range is selected, from either of its two output ports. The control valve 900 is equipped with a spool 901 having four lands, and a spring 902 which is arranged at one end portion of the spool 901. A control port 903 formed at the side opposed to that spring 902 is connected with the second solenoid valve $S_2$. The control valve 900 is further formed with one input port 904, two output ports 905 and 906, and two drain ports 907 and 908. The input port 904 is connected with the parking range oil passage 111. When the control valve 900 is relieved from its control port 903 to have its spool 901 pushed up to a position, as indicated at the righthand half of FIG. 7, its input port 904 communicates with one output port (as will be tentatively referred to as the "first output port") 905, and the other output port (as will be tentatively referred to as the "second output port") 906 communicates with the drain port 908. On the other hand, when the spool 901 is pushed down to a position, as indicated at the lefthand half of FIG. 7, by the line pressure $P_L$ applied to the control port 903, the input port 904 communicates with the second output port 906, and the first output port 905 communicates with the drain port 907.

On the other hand, the change valve 910 switches and outputs its input oil pressure to a lock port and an unlock port and is equipped with a spool 911 having four lands and a spring 912 for pushing the spool 911 to one end portion. The change valve 910 is formed, at its end portion opposed to the end portion equipped with the spring 912, with a control port 913 for applying the oil pressure in the direction to compress the spring 912. The control valve 913 is connected with the aforementioned linear solenoid valve $S_{LU}$. The change valve 910 is further formed with two input ports 914 and 915, two unlocking ports 916 and 917 and one locking port 918. One input port (as will be tentatively referred to as the "first input port") 914 is connected with the aforementioned first output port 905, and the other input port (as will be tentatively referred to as the "second input port") 915 is connected with the aforementioned second output port 906.

When the change valve 910 is relieved from its control port 913 because the linear solenoid valve $S_{LU}$ is in its OFF state, its spool 912 is pushed up to a position, as indicated at the lefthand half of FIG. 7, so that the first input port 914 communicates with the locking port 918 whereas the second input port 915 communicates with one unlocking port (as will be tentatively referred to as the "second unlocking port") 917. On the other hand, when the spool 911 is pushed down to a position, as indicated at the righthand half of FIG. 7, by the high oil pressure fed from the linear solenoid valve $S_{LU}$, the first input port 914 communicates with the other unlocking port (as will be tentatively referred to as the "first unlocking port") 916, and the second input port 915 communicates with the locking port 918.

The oil pressure servo 920 is constructed as the so-called "double-action cylinder". A forward port 922 for applying the oil pressure to push a piston 921 forward (i.e., to the right of FIG. 7) is connected with the aforementioned locking port 918, and a return port 923 for applying the oil pressure to push the piston 921 backward (i.e., to the left of FIG. 7) is connected with the aforementioned two unlocking ports 916 and 917 communicating with each other. Moreover, a conical cam 925 is so fitted on a rod 924 integrated with the piston 921 as to move back and forth within a predetermined range and is urged forward (i.e., to the right of FIG. 7) by the action of a spring 926. On the other hand, the rod 924 is formed in its base end portion with a recess, in which are fitted balls 927. These balls 927 are urged toward the axis of the rod 924 by the action of springs 928. In short, here is constructed a detent mechanism. As the piston 921 moves forward, the cam 925 turns a parking lock pole 929 to block the rotation of the output shaft 15. More specifically, the parking lock pole 929 comes into engagement with the rear side ring gear 14, as shown in FIG. 3, to block the rotation of the ring gear 14 thereby to fix the output shaft 15.

In the automatic transmission equipped with the oil pressure control system thus far described, the individual frictional engagement elements are engaged or disengaged to set one of the gear stages, as tabulated in the clutch/brake application chart of FIG. 8 by turning ON/OFF the first to fourth solenoid valves $S_1$ to $S_5$ and the linear solenoid valve $S_{LU}$, as tabulated in the clutch/brake application chart of FIG. 8. In FIG. 8: for the solenoid valves, symbols o indicate "ON", symbols x indicate "OFF", and the remaining symbols indicate either "ON" or "OFF"; and for the frictional engagement elements, the symbols o indicate the engaged states, the symbols x indicate the disengaged states, and the remaining symbols indicate either the engaged states or the disengaged states. The P-range and the N-range are set by feeding the oil pressure to predetermined portions through the aforementioned parking range oil passage 111. Like this, the R-range, the D-range and the engine braking range are set by feeding the oil pressure to predetermined portions, respectively, through the R-range oil passage 110, the D-range oil passage 112 and the engine braking range oil passage 113. The feed and release of the oil pressure for setting those individual ranges are achieved by controlling the individual range changing valves 200 and 300 and the change valve 420 with the third to fifth solenoid valves $S_3$ to $S_5$. The ON/OFF states of the third to fifth solenoid valves $S_3$ to $S_5$ therefor are different depending upon whether or not they fail.

Specifically, FIGS. 9A to 9F are ON/OFF charts of the third to fifth solenoid valves $S_3$ to $S_5$ corresponding to their individual failing states. FIG. 9A is a chart in a normal state without any failure or at the time of a failure when the fifth solenoid valve $S_5$ is OFF. Incidentally, this state is similar to that shown in FIG. 8. In this case, the fifth solenoid valve $S_5$ is OFF even if any range is to be set, whereas both the third solenoid valve $S_3$ and the fourth solenoid valve $S_4$ are turned ON when the R-range is to be set. As a result, the first range changing valve 200 has its spool 201 pushed up, as indicated at the righthand half of FIG. 5, so that the second range changing valve 300 has its first input port 304 fed with the oil pressure from the first output 205 of the first range changing valve 200. The second range changing valve 300 is also relieved from its control port 303 to have its spool 301 pushed up to the position, as indicated at the righthand half of FIG. 5, so that its first input port 304 communicates with the R-range port 306, from which is outputted the oil pressure to the first input port 425 of the change valve 420. Moreover, this change valve 420 has its spool 421 pushed down to a position, as indicated at the lefthand half of FIG. 5, so that its first input port 425 communicates with the first R-port 429. As a result, the oil pressure is fed to the check ball valves 103 and 105 through the R-range oil passage 110 connected with the first R-port 429.

When the D-range is selected, on the other hand, the third solenoid valve $S_3$ is turned ON, but the fourth solenoid valve $S_4$ is turned OFF. As a result, the first range changing valve 200 takes a state similar to that of the aforementioned R-range so that its first output port 205 feeds the oil pressure to the first input port 304 of the second range changing valve 300. However, the second range changing valve 300 has its control port 303 fed with the line pressure $P_L$ to have its spool pushed down to the position, as indicated at the lefthand half of FIG. 5, so that its first input port 304 communicates with the D-range port 307, from which is fed the oil pressure to the third input port 427 in the change valve 420. Since the third input port 427 is in communication with the D-range oil passage 112, the oil pressure is fed from the check ball valve 104 to the first clutch $C_1$ through the D-range oil passage 112 connected with the first D-port 432.

On the other hand, when the engine braking range is selected, the third solenoid valve $S_3$ is turned OFF whereas the fourth solenoid valve $S_4$ is turned ON. As a result, the first range changing valve 200 has its spool 201 pushed down to a position, as indicated at the lefthand half of FIG. 5, so that the oil pressure is fed from the second output port 206 to the second input port 305 of the second range changing valve 300. Since the second range changing valve 300 has its spool 301 pushed up to a position, as indicated at the righthand half of FIG. 5, as in the aforementioned case of the R-range, its second input port 305 communicates with the engine braking port 308, from which the oil pressure is fed to the fourth input port 428 of the change valve 420. Since this change valve 420 has its fourth input port 428 communicating with the engine braking port 433, the oil pressure is fed from the engine braking range oil passage 113 partly to the engine braking range oil passage 113 and partly to the 2-3 shift valve 600.

In the N-range (and the P-range), both the third and fourth solenoid valves $S_3$ and $S_4$ are turned OFF. As a result, the first range changing valve 200 takes a state similar to that of the case of the aforementioned engine braking range so that the oil pressure is fed to the second input port 305 of the second range changing valve 300. Since this second range changing valve 300 has its spool 301 pushed down to a position, as indicated at the lefthand half of FIG. 5, as in the aforementioned case of the D-range, the second input port 305 communicates with the parking port 311, from is fed the oil pressure to the second input port 426 of the change valve 420. Moreover, since the second input port 426 is in communication with the parking port 430, the oil pressure is fed to the control valve 900 of the parking lock mechanism through the parking range oil passage 111 connected with the parking port 430.

FIG. 9B is a clutch/brake application chart in case of failure, in which the third solenoid valve $S_3$ is short-circuited or the like so that it is always ON. In this case of failure, the first range changing valve 200 is relieved from the oil pressure only from its first output port 205. In accordance with this, the second range changing valve 300 outputs the oil pressure from either the R-range port 306 or the D-range port 307 no matter whether the fourth solenoid valve $S_4$ might be turned ON or OFF. In this case of failure, therefore, the fourth solenoid valve $S_4$ and the fifth solenoid valve $S_5$ are operated contrary to the aforementioned normal case (or the case in which the fifth solenoid valve $S_5$ is broken) when the engine braking range and the N-range (or the P-range) are to be set. In short, when the engine braking range is selected, the fourth solenoid valve $S_4$ is turned OFF whereas the fifth solenoid valve $S_5$ is turned ON. As a result, the second range changing valve 300 has spool 301 pushed down to a position, as indicated at the lefthand half of FIG. 5, its first input port 304 fed with the oil pressure communicates with the D-range port 307, from which is fed the oil pressure to the third input port 427 of the change valve 420. Moreover, since this change valve 420 is relieved from its control port 423 to have its spool 421 pushed up to a position, as indicated at the righthand half of FIG. 5, its third input port 427 communicates with the engine braking port 433 so that it can feed the oil pressure through the engine braking range oil passage 113.

When the N-range (or the P-range) is selected, on the other hand, the third solenoid valve $S_3$ and the fourth solenoid valve $S_4$ are turned ON. In the second range changing valve 300, therefore, the second input port 304 fed with the oil pressure communicates with the R-range port 306, from which is fed the oil pressure to the first input port 425 of the change valve 420. Moreover, this change valve 420 has its spool 421 pushed up to a position, as indicated at the righthand half of FIG. 5, so that its first input port 425 communicates with the parking port 430 to feed the oil pressure through the parking range oil passage 111. Incidentally, the R-range and the D-range are set as usual.

FIG. 9C is a clutch/brake application chart of the case of failure, in which the third solenoid valve $S_3$ is broken or the like so that it is left OFF. In this case, in the R-range and the D-range in which the third solenoid valve $S_3$ is turned ON in the normal state, the fourth solenoid valve $S_4$ and the fifth solenoid valve $S_5$ are operated contrary to the normal state. Specifically in this case, the oil pressure is left fed from the second output port 206 of the first range changing valve 200 to the second input pore 305 of the second range changing valve 300. Therefore, when the R-range is to be set, the fourth solenoid valve $S_4$ is turned OFF whereas the fifth solenoid valve $S_5$ is turned ON. As a result, the second range changing valve 300 has its spool 301 pushed down to a position, as indicated at the lefthand half of FIG. 5, so that its second input port 305 fed with the oil pressure communicates with the parking port 311, from which is fed the oil pressure to the second input port 426 of the change valve 420. Moreover, since this change valve 420 has its spool 421 pushed up to a position, as indicated at the righthand half of FIG. 5, its fourth input port 428 communicates with the engine braking port 433 to output the oil pressure to the engine braking range oil passage 113. Incidentally, the engine braking range and the N-range (or the P-range) are set as in the normal state.

FIG. 9D is a clutch/brake application chart of tile case of failure in which the fourth solenoid valve $S_4$ is short-circuited or the like so that it is kept ON. In this case, the third solenoid valve $S_3$ and the fifth solenoid valve $S_5$ are operated contrary to the normal state when the D-range and the N-range (or the P-range) are to be set. Specifically in this case, the second range changing valve 300 has its spool 301 pushed up to a position, as indicated at the righthand half of FIG. 5, so that its first input port 304 is left in communication with the R-range port 306 and its second input port 305 is left in communication with the engine braking port 308. Therefore, when the D-range is to be set, the third solenoid valve $S_3$ is turned OFF whereas the fifth solenoid valve $S_5$ is turned ON. As a result, as in the aforementioned case of failure of the D-range in which the third solenoid valve $S_3$ is turned OFF, the oil pressure is fed to the D-range oil passage 112 to set the D-range.

On the other hand, when the N-range (or the P-range) is to be set, both the third solenoid valve $S_3$ and the fifth solenoid valve $S_5$ are turned ON. This operation is similar to that of the N-range (or the P-range) of the case of failure in which the third solenoid valve $S_3$ is turned ON, as tabulated in FIG. 9B. The oil pressure is fed to the parking range oil passage 111 to set the N-range (or the P-range). Incidentally, the R-range and the engine braking range are set as in the normal state.

FIG. 9E is a clutch/brake operation chart of the case of failure in which the fourth solenoid valve $S_4$ is broken or the like so that it remains OFF as contrary to the aforementioned case. When the R-range and the engine braking range are to be set in this case, the third solenoid valve $S_3$ and the fifth solenoid valve $S_5$ are operated contrary to the ordinary state. Specifically, when the R-range is selected, the third solenoid valve $S_3$ is OFF whereas the fifth solenoid valve $S_5$ is ON. These ON/OFF states are similar to those of the R-range in the case of failure in which the third solenoid valve $S_3$ is turned OFF, as tabulated in FIG. 9C. As a result, the oil pressure is fed to the aforementioned R-range oil passage to set the R-range.

On the other hand, when the engine braking range is selected, both the third solenoid valve $S_3$ and the fifth solenoid valve $S_5$ are turned ON. This operation is similar to that of the engine braking range in the case of failure in which the third solenoid valve $S_3$ is kept ON, as tabulated in FIG. 9B. Thus, the oil pressure is fed to the aforementioned engine braking range oil passage 113 to set the engine braking range. Incidentally, the D-range and the N-range (or the P-range) are set as in the normal state.

FIG. 9F is a clutch/brake application chart of the case of failure in which the fifth solenoid valve $S_5$ is short-circuited or the like so that it is turned ON. In this case, the change valve 420 has its spool 421 left pushed up to a position, as indicated at the righthand half of FIG. 5. In this case, therefore, the third solenoid valve $S_3$ and the fourth solenoid valve $S_4$ are operated in all ranges contrary to that of the normal state. Specifically, when the R-range is to be set, both the third solenoid valve $S_3$ and the fourth solenoid valve $S_4$ are turned OFF. These operations are similar to those of the R-range of FIG. 9C. When the D-range is to be set, on the other hand, the third solenoid valve $S_3$ is turned OFF whereas the fourth solenoid valve $S_4$ is turned ON. These operations are also similar to those of the D-range of FIG. 9C. Moreover, when the engine braking range is to be set, the third solenoid valve $S_3$ is turned ON whereas the fourth solenoid valve $S_4$ is turned OFF. These operations are also similar to those of the engine braking range of FIG. 9B. Furthermore, when the N-range (or the P-range) is to be set, both the third solenoid valve $S_3$ and the fourth solenoid valve $S_4$ are turned ON. These operations are also similar to those of the N-range (or the P-range) of FIG. 9B.

Thus, in the oil pressure control system thus far described, all the ranges can be set no matter what of the third to fifth solenoid valves $S_3$ to $S_5$ might fail.

Here will be described the actions of the parking lock mechanism shown in FIG. 7. Usually when the P-range is selected, the second solenoid valve $S_2$ is ON whereas the linear solenoid valve $S_{LU}$ is OFF so that no oil pressure is applied to the control port 903 of the control valve 900. Thus, when the P-range is selected, the control valve 900 has its spool 901 pushed up, as indicated at the righthand half of FIG. 7, so that the oil pressure fed from the input port 904 is outputted from the first output port 905 and fed to the first input port 914 of the change valve 910. Moreover, since the change valve 910 is relieved from its control port 913, its spool 911 is pushed up to a position, as indicated at the lefthand half of FIG. 7. As a result, the oil pressure fed to the first input port 914 is fed from the locking port 918 to the forward port 922 of the oil pressure servo 920. In accordance with this, the piston 921 and the rod 924 move forward so that the parking lock pole 929 blocks the rotation of the output shaft 15. This state is maintained by the aforementioned detent mechanism.

On the contrary, when the second solenoid valve $S_2$ is switched OFF (i.e., to the N-range), the change valve 900 has its control port 903 fed with the line pressure $P_L$ to have its spool 901 pushed down to a position, as indicated at the lefthand half of FIG. 7. As a result, the first input port 904 fed with the oil pressure communicates with the second output port 906, from which is fed the oil pressure to the second input port 915 of the change valve 910. Since the second input port 915 is in communication with the second unlocking port 917, the return port 923 of the oil pressure servo 920 is fed with the oil pressure. As a result, the piston 921 and the rod 924 move back to release the parking lock state in which the rotation of the output shaft 15 is blocked.

Incidentally, if the control valve 900 has its spool 901 troubled and fixed in the position, as indicated at the lefthand half of FIG. 7, the output shaft 15 can be locked and unlocked through the parking lock mechanism by operating the change valve 910 contrary to the aforementioned operations. Specifically, in this case, the oil pressure is outputted from the second output port 906 of the control valve 900 to the second input port 915 of the change valve 910. Therefore, if the linear solenoid valve $S_{LU}$ is turned ON to push down the spool 911 of the change valve 910 to the position, as indicated at the righthand half of FIG. 7, the oil pressure is outputted from the locking port 918. On the other hand, if the linear solenoid valve $S_{LU}$ is turned OFF to push down the spool 911 of the change valve 910 to the position, as indicated at the lefthand half of FIG. 7, the oil pressure is outputted from the second unlocking port 917 to unlock the output shaft 15.

As described above, the change valve 910 causes its second input port 915 to communicate with the second unlocking port 917, when its first input port 914 is in communication with the locking port 918, and its second input port 915 to communicate with the locking port 918 when its first input port 914 is in communication with the first unlocking port 916. In case, therefore, the change valve 910 has its spool 911 fixed in the position, as indicated at the righthand or lefthand half of FIG. 7, the output shaft 15 can be locked and unlocked if the output of the oil pressure from the control valve 900 is switched to the first output port 905 and the second output port 906. In other words, if the change valve 910 has its spool 911 fixed in the position, as indicated at the lefthand half of FIG. 7, the parking is locked by outputting the oil pressure from the first output port 905, and the parking is unlocked by outputting the oil pressure from the second output port 906. On the other hand, if the change valve 910 has its spool 911 fixed in the position, as indicated at the righthand half of FIG. 7, the parking is unlocked by outputting the oil pressure from the first output port 905, and the parking is locked by outputting the oil pressure from the second output port 906.

Thus, in the construction shown in FIG. 7, the parking lock mechanism can be switched, as usual, even in case of failure in which the control valve or the change valve 910 does not operate.

Figure 10:
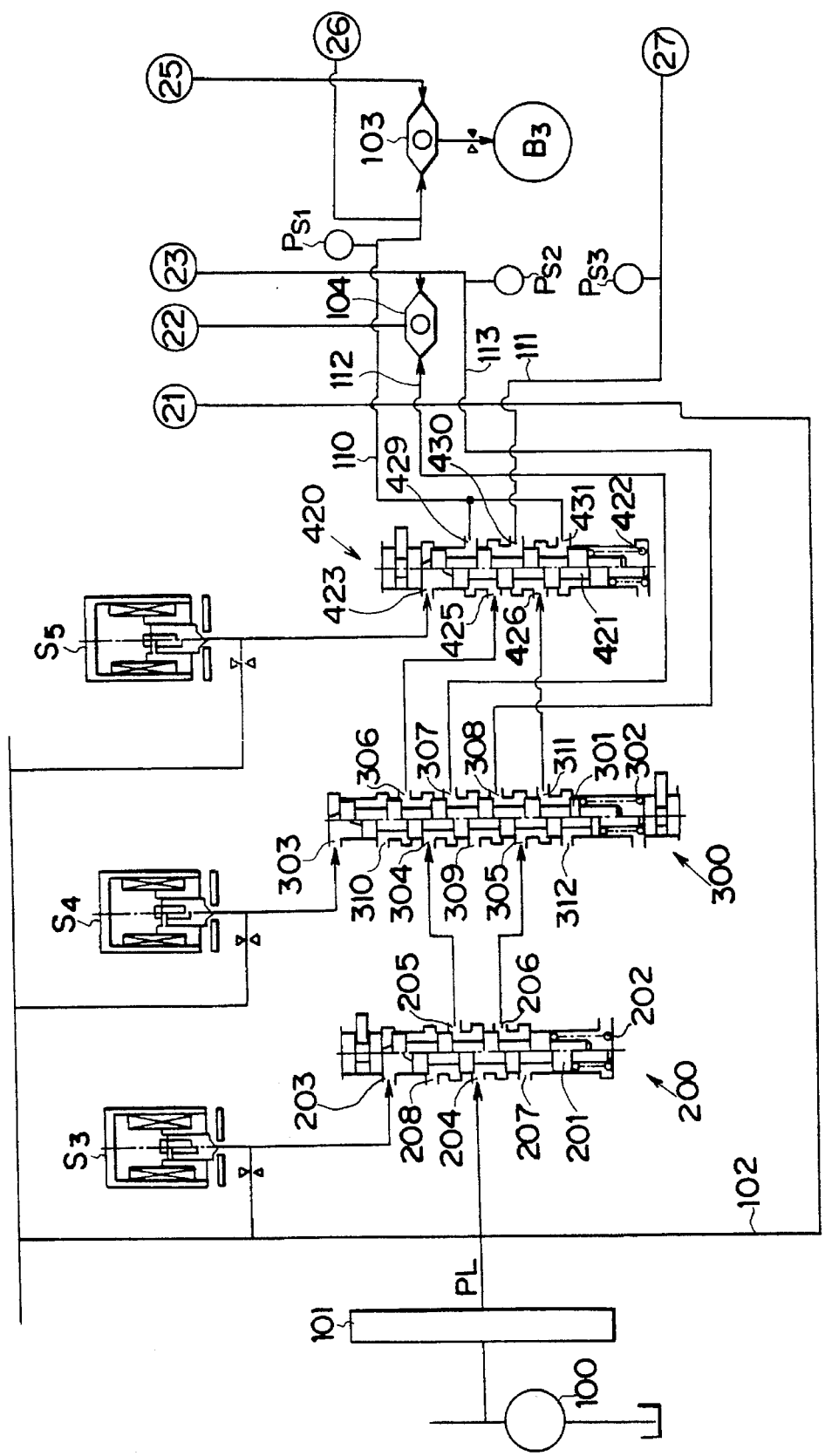
FIG. 10 is a diagram showing another circuit capable of taking place of the oil pressure circuit shown in FIG. 5.

FIG. 10 is a diagram showing a portion of an oil pressure circuit of another embodiment of the present invention. The embodiment is modified such that the aforementioned change valve 420 has its axial length shortened by omitting therefrom the third input port 427, the fourth input port 428, the first and second D-ports 432 and 434, and the engine braking port 433. As a result, the D-range oil passage 112 is connected with the D-range port 307 of the second range changing valve 300, and the engine braking range oil passage 113 is connected with the engine brake port 308 of the second change valve 300. Incidentally, reference characters $P_{S1}$, $P_{S2}$ and $P_{S3}$ designate individual pressure switches.

In this embodiment shown in FIG. 10, therefore, the oil pressure can be outputted either the first output port 205 or the second output port 206 of the first range changing valve 200 even if the third solenoid valve $S_3$ fails, and the oil pressure can be outputted from either the R-range port 306 and the D-range port 307 or the engine braking port 308 and the parking port 311 of the second range changing valve 300 even if the fourth solenoid valve $S_4$ fails. As a result, the oil pressure is inputted to the change valve 420 through either of the first and second input ports 425 and 426, which can be made to communicate with the output port or the parking port 430.

Thus, in the embodiment of FIG. 10, either the D-range or the engine braking range and the N-Range can be set without fail to ensure the limp home running. Moreover, the change valve 420 can have its axial length shortened to prevent its stick or any malfunctions which might otherwise be caused thereby.

Figure 11:
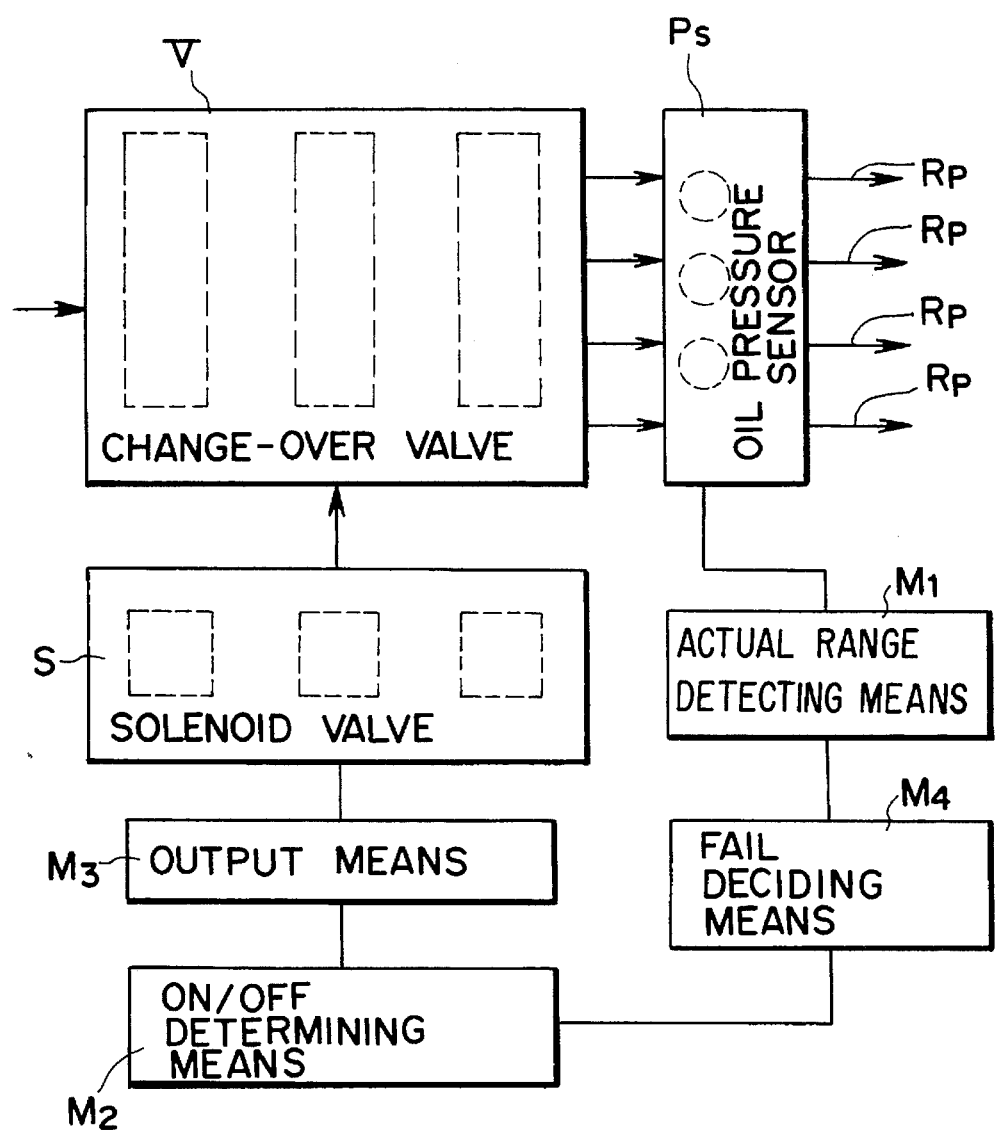
FIG. 11 is a block diagram showing another embodiment of the present invention schematically.

As has been described with reference to FIGS. 9A to 9F, the automatic transmission equipped with the oil pressure control system shown in FIGS. 5 to 7 is enabled to set the individual ranges by changing the ON/OFF states of the solenoid valves $S_3$, $S_4$ and $S_5$ if any of the change valves 200, 300 and 420 fails to operate. Especially with the oil pressure circuit shown in FIG. 10, moreover, the failure can be detected by means of the pressure switches $P_{S1}$, $P_{S2}$ and $P_{S3}$. Thus, where a running range having a corresponding output signal for directing the running range does not correspond to the detected running range as detected by one or more of the oil pressure sensors, the occurrence of a failure can be decided. As will be readily understood by those skilled in the art, this failure determination can be performed by an ECU (electronic control unit) as represented at $M_4$ in FIG. 11. FIG. 11 is a block diagram schematically showing a system for controls at the time of failure on the basis of the output signals coming from those pressure switches $P_{S1}$, $P_{S2}$ and $P_{S3}$. Specifically, the system, as shown, is equipped with a plurality of change-over valves V, solenoid valves for actuating those changeover valves, and a plurality of range setting oil passages $R_P$ for feeding the oil pressures outputted from the change-over valves to set the ranges. The system feeds the oil pressure to predetermined one of the range setting oil passages $R_P$ in combination of the plurality of kinds of ON/OFF operations of the aforementioned solenoid valves. This system is further equipped with: oil pressure sensors $P_S$ for detecting the oil pressures in the aforementioned range setting oil passages $R_P$; range detecting means $M_1$ for detecting the range on the basis of the oil pressures detected by those oil pressure sensors $P_S$; ON/OFF determining means $M_2$ for determining the combination of the ON/OFF operations of the solenoid valves S to set the selected range; output means $M_3$ for outputting signals to the aforementioned individual solenoid valves S so as to establish the ON/OFF combination of the aforementioned solenoid valves S determined by that ON/OFF determining means $M_2$; and fail deciding means $M_4$ for instructing the aforementioned ON/OFF determining means $M_2$ of the change in the ON/OFF combination of the aforementioned solenoid valves S so as to set the selected range if the range detecting by the aforementioned range detecting means $M_1$ and the aforementioned selected range are different.

In this system, the plurality of solenoid valves S are suitably turned ON or OFF in response to the output signals from the output means $M_3$ so that the change-over valves V are actuated in accordance with the ON/OFF operations to feed the oil pressure to the predetermined one of the range setting oil passages $R_P$. The combination of the ON/OFF operations of the solenoid valves S is determined on the basis of the selected range by the ON/OFF determining means $M_2$, but a plurality of ON/OFF combination can exist for the predetermined one of the ranges so that its predetermined one is outputted by the ON/OFF determining means $M_2$. In case the solenoid valves S and the change-over valves V are normal in their operations, the oil pressure is so built up in the range setting oil passages $R_P$ as to set the selected range. However, if any of the change-over valves V is troubled, the oil pressure is so produced in the range setting oil passages $R_P$ as to set a range different from the selected one. As a result, the range detected by the range detecting means $M_1$ and the selected range are different, and this failure is decided by the fail deciding means $M_4$. Then, this fail deciding means $M_4$ outputs its signal to the ON/OFF determining means $M_2$ to cause it to change the ON/OFF combination for setting the selected range into another. This example is shown in FIGS. 9A to 9F. As a result, even if any of the change-over valves V fails depending upon the selected range, this range can be set by using that particular change-over valve as it is, to retain the running.

What is claimed is:

1. A control system for a shift-by-wire automatic transmission, comprising:

a range changing mechanism including two range changing valves connected in series with each other and adapted to output an oil pressure selectively to at least one of a plurality of oil passages;

at least two range setting oil passages; and a change-over valve including at least two input ports operatively connected with said range changing mechanism through said plurality of oil passages and at least two output ports connected with two of said at least two range setting oil passages, said change-over valve for changing the communicating states of said at least two input ports with respect to said at least two output ports.

2. A control system for a shift-by-wire automatic transmission according to claim 1, further comprising:

fail detecting means for detecting a failure that any of said range changing valves becomes inoperative; and drive means for switching said change-over valve if said fail detecting means detects said failure.

3. A control system for a shift-by-wire automatic transmission according to claim 1, further comprising:

a solenoid valve for operating said range changing valve;

another solenoid valve for operating said change-over valve;

ON/OFF determining means for determining the ON/OFF states of said solenoid valves to set a selected range;

output means for outputting a signal to the individual ones of said solenoid valves to make such an ON/OFF combination of said solenoid valves as is determined by said ON/OFF determining means;

detecting means for detecting the output state of the oil pressure to said range setting oil passages;

range detecting means for detecting a range on the basis of the detected result of said detecting means; and fail deciding means for instructing said ON/OFF deciding means to change the ON/OFF combination of said solenoid valves so as to set said selected range if the range detected by said range detecting means and said selected range are different.

4. A control system for a shift-by-wire automatic transmission according to claim 3, wherein said detecting means includes oil pressure sensors.

5. The control system of claim 1, wherein said at least two input ports of said change-over valve include a first input port and a second input port, and wherein said at least two output ports of said change-over valve include a first output port, a second output port and a third output port;

wherein in a first position of said change-over valve, said first input port communicates with said first output port and said second input port communicates with said second output port, and further wherein in a second position of said change-over valve said first input port communicates with said second output port and said second input port communicates with said third output port; and wherein said at least two range setting oil passages include a first oil passage connected to said first output port and said third output port, and a second oil passage connected to said second output port.

6. The control system of claim 5, wherein said changeover valve further includes a third input port, a fourth input port, a fourth output port, a fifth output port and a sixth output port; and wherein in said first position of said change-over valve said third input port communicates with said fourth output port and said fourth input port communicates with said fifth output port, and in said second position of said change-over valve said third input port communicates with said fifth output port and said fourth input port communicates with said sixth output port;

the control system further including a third oil passage connected to said fourth output port and said sixth output port, and a fourth oil passage connected to said fifth output port.

* * * * *

UNITED STATES PATENT AND TRADEMARK OFFICE
CERTIFICATE OF CORRECTION

PATENT NO. : 5,505,674
DATED : April 9, 1996
INVENTOR(S) : Toshiharu Furukawa, et. al.

It is certified that error appears in the above-indentified patent and that said Letters Patent is hereby corrected as shown below:

Title page, item [54] and col. 1, line 2, in the Title, change--
"CHANGEOVER" to --CHANGE-OVER--;
    also at [73], Assignee: change "Toyoda" to--Toyota--.
Column 20, line 35, change "changeover" to --change-over--.

Signed and Sealed this

Twenty-seventh Day of August, 1996

Attest:

BRUCE LEHMAN

*Attesting Officer*  *Commissioner of Patents and Trademarks*